United States Patent [19]
Hartman et al.

[11] Patent Number: 5,880,441
[45] Date of Patent: Mar. 9, 1999

[54] MICROWAVE BEVERAGE MAKER APPARATUS AND METHOD

[75] Inventors: Gary J. Hartman, Chippewa Falls; John A. Comerford, Eau Claire, both of Wis.

[73] Assignee: National Presto Industries, Inc., Eau Claire, Wis.

[21] Appl. No.: 969,112

[22] Filed: Nov. 12, 1997

[51] Int. Cl.⁶ ...................................................... B65D 6/08
[52] U.S. Cl. ............................................. 219/689; 99/280
[58] Field of Search .................................... 219/687, 689; 99/280, 304, DIG. 4, 292

[56] References Cited

U.S. PATENT DOCUMENTS

| | | |
|---|---|---|
| 1,346,485 | 7/1920 | Arrigunaga . |
| 1,428,046 | 9/1922 | Mock . |
| 1,601,671 | 9/1926 | Bonell . |
| 1,797,672 | 3/1931 | Paolini . |
| 2,022,467 | 11/1935 | Heyman . |
| 2,110,732 | 3/1938 | Kane . |
| 2,123,054 | 7/1938 | Lamb et al. . |
| 2,133,166 | 10/1938 | Fritsche . |
| 2,137,243 | 11/1938 | Heyman . |
| 2,146,753 | 2/1939 | Luckhaupt . |
| 2,147,831 | 2/1939 | Doble . |
| 2,157,656 | 5/1939 | Doble . |
| 2,162,272 | 6/1939 | Patterson . |
| 2,187,417 | 1/1940 | Doble . |
| 2,211,486 | 8/1940 | Zoia . |
| 2,285,113 | 6/1942 | Eaton . |
| 2,291,278 | 7/1942 | Cleaves . |
| 2,377,118 | 5/1945 | Weisman . |
| 2,495,435 | 1/1950 | Welch . |

(List continued on next page.)

FOREIGN PATENT DOCUMENTS

| | | |
|---|---|---|
| 734798 | 5/1966 | Canada . |
| 0 177 281 | 4/1986 | European Pat. Off. . |

OTHER PUBLICATIONS

Photographs of a Porter Products Inc. Big Sky Bistro ™ coffee press.
Copy of product packaging from Porter Products Inc. Big Sky Bistro ™ coffee press.

*Primary Examiner*—Teresa Walberg
*Assistant Examiner*—Jeffrey Pwu
*Attorney, Agent, or Firm*—Merchant, Gould, Smith, Edell, Welter & Schmidt, P.A.

[57] ABSTRACT

A beverage-brewing apparatus is provided which includes an outer cup member and an inner cup member. The outer cup member includes an open top, a sidewall and a bottom. The inner cup member has a sidewall, a first seal and a basket portion, with the sidewall of the inner cup member dimensioned to fit within the sidewall of the outer cup member. The first seal is disposed along an outer surface of the inner cup member for engaging the inner sidewall of the outer cup member to form a seal while still permitting the inner cup member to move within the outer cup member. The basket portion of the inner cup member is disposed at the bottom of the inner cup member. The basket portion includes a base with at least one aperture and a first filter medium, a sidewall, and a cap member having at least one aperture and a second filter medium. The cap member is releasably connected to the sidewall of the basket portion so that brewing material can be securely retained within the basket portion between the filter medium. The inner cup member is slidable between a first upper position where the basket portion of the inner cup member is disposed above the base of the outer cup member and a second lower position where the basket portion of the inner cup member is disposed against the base of the outer cup member such that liquid is forced through the basket portion when the inner cup member moves between the first and second positions with the first seal engaging the sidewall of the outer cup member. The apparatus preferably includes a lid having an aperture which is secured to the apparatus to close the apparatus.

7 Claims, 12 Drawing Sheets

U.S. PATENT DOCUMENTS

| | | |
|---|---|---|
| 2,601,067 | 6/1952 | Spencer . |
| 2,698,082 | 12/1954 | Maloney . |
| 2,749,834 | 6/1956 | Hiscock . |
| 2,786,761 | 3/1957 | Weisman . |
| 2,805,164 | 9/1957 | Doppler . |
| 2,824,002 | 2/1958 | Hiscock . |
| 2,885,290 | 5/1959 | Krasker . |
| 2,935,928 | 5/1960 | Keating et al. . |
| 2,962,201 | 11/1960 | Brillis et al. . |
| 3,108,881 | 10/1963 | Shaw et al. . |
| 3,199,437 | 8/1965 | Nelsen . |
| 3,347,151 | 10/1967 | Ronalds . |
| 3,348,469 | 10/1967 | Kasakoff . |
| 3,384,492 | 5/1968 | Spencer . |
| 3,517,604 | 6/1970 | Coors . |
| 3,640,727 | 2/1972 | Heusinkveld . |
| 3,657,993 | 4/1972 | Close . |
| 3,797,642 | 3/1974 | Dobry et al. . |
| 3,809,215 | 5/1974 | Dobry . |
| 3,846,569 | 11/1974 | Kaplan . |
| 3,879,565 | 4/1975 | Einstman et al. . |
| 3,927,608 | 12/1975 | Doyel . |
| 3,935,318 | 1/1976 | Mihailide . |
| 4,061,793 | 12/1977 | Daswick . |
| 4,080,299 | 3/1978 | Bartolome . |
| 4,086,848 | 5/1978 | Hahn . |
| 4,104,957 | 8/1978 | Freedman et al. . |
| 4,204,004 | 5/1980 | Farr et al. . |
| 4,211,156 | 7/1980 | Zimmermann . |
| 4,224,168 | 9/1980 | Trägårdh . |
| 4,229,481 | 10/1980 | Fornari . |
| 4,278,691 | 7/1981 | Donarumma et al. . |
| 4,345,512 | 8/1982 | Moore . |
| 4,365,544 | 12/1982 | Howitt . |
| 4,381,696 | 5/1983 | Koral . |
| 4,386,109 | 5/1983 | Bowen et al. . |
| 4,410,550 | 10/1983 | Gaskill . |
| 4,443,481 | 4/1984 | Donarumma et al. . |
| 4,465,697 | 8/1984 | Brice et al. . |
| 4,471,689 | 9/1984 | Piana . |
| 4,550,024 | 10/1985 | Le Granse . |
| 4,577,080 | 3/1986 | Grossman . |
| 4,642,443 | 2/1987 | Jorgensen et al. . |
| 4,721,835 | 1/1988 | Welker . |
| 4,756,915 | 7/1988 | Dobry . |
| 4,806,369 | 2/1989 | Thompson . |
| 4,908,222 | 3/1990 | Yu . |
| 4,948,601 | 8/1990 | Serbu . |
| 4,990,734 | 2/1991 | Hirsch . |
| 4,999,470 | 3/1991 | Fuchs et al. ............................ 219/689 |
| 5,079,396 | 1/1992 | Katz et al. . |
| 5,095,185 | 3/1992 | Fuchs, Jr. . |
| 5,135,764 | 8/1992 | Claussi et al. . |
| 5,151,199 | 9/1992 | Poulin et al. . |
| 5,168,140 | 12/1992 | Welker . |
| 5,233,145 | 8/1993 | Schiettecatte . |
| 5,243,164 | 9/1993 | Erickson et al. ........................ 219/689 |
| 5,281,783 | 1/1994 | An . |
| 5,281,785 | 1/1994 | Pasbrig . |
| 5,300,743 | 4/1994 | Park . |
| 5,309,823 | 5/1994 | Allen . |
| 5,315,083 | 5/1994 | Green . |
| 5,424,083 | 6/1995 | Lozito . |
| 5,434,392 | 7/1995 | Belingoff et al. ....................... 219/689 |
| 5,461,968 | 10/1995 | Portman . |
| 5,478,586 | 12/1995 | Connor . |
| 5,545,879 | 8/1996 | Brotz . |
| 5,618,570 | 4/1997 | Banks et al. . |

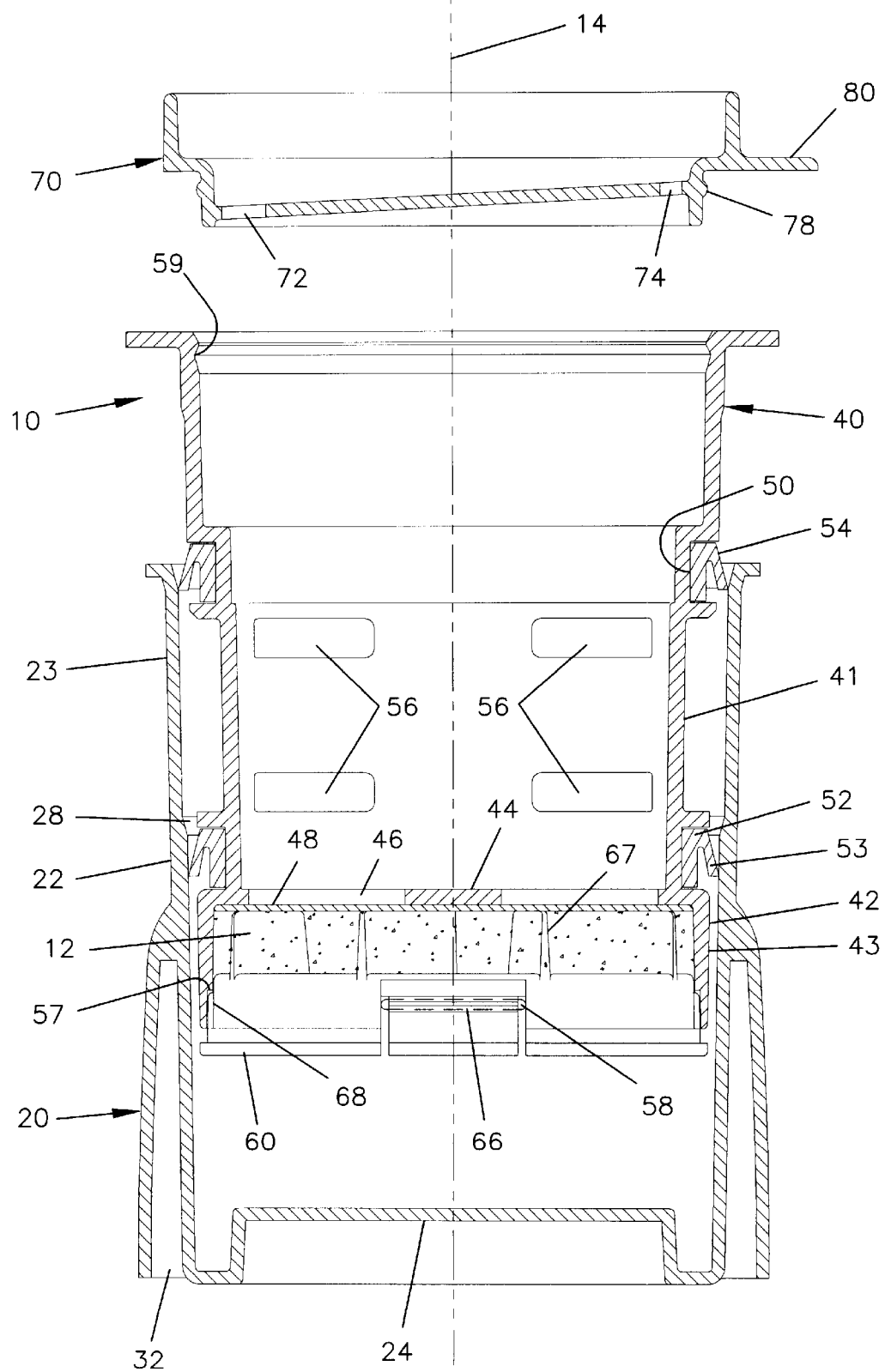

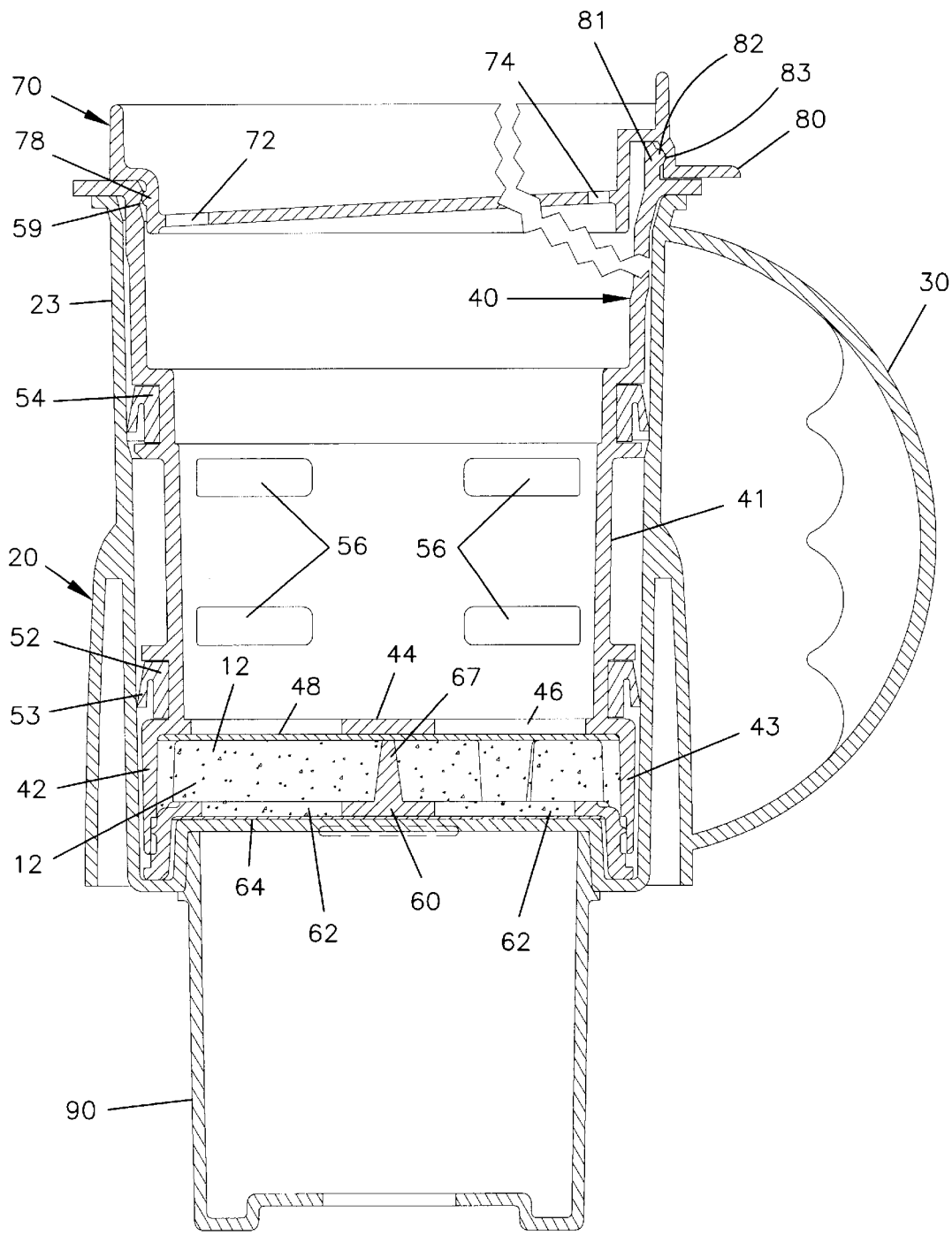

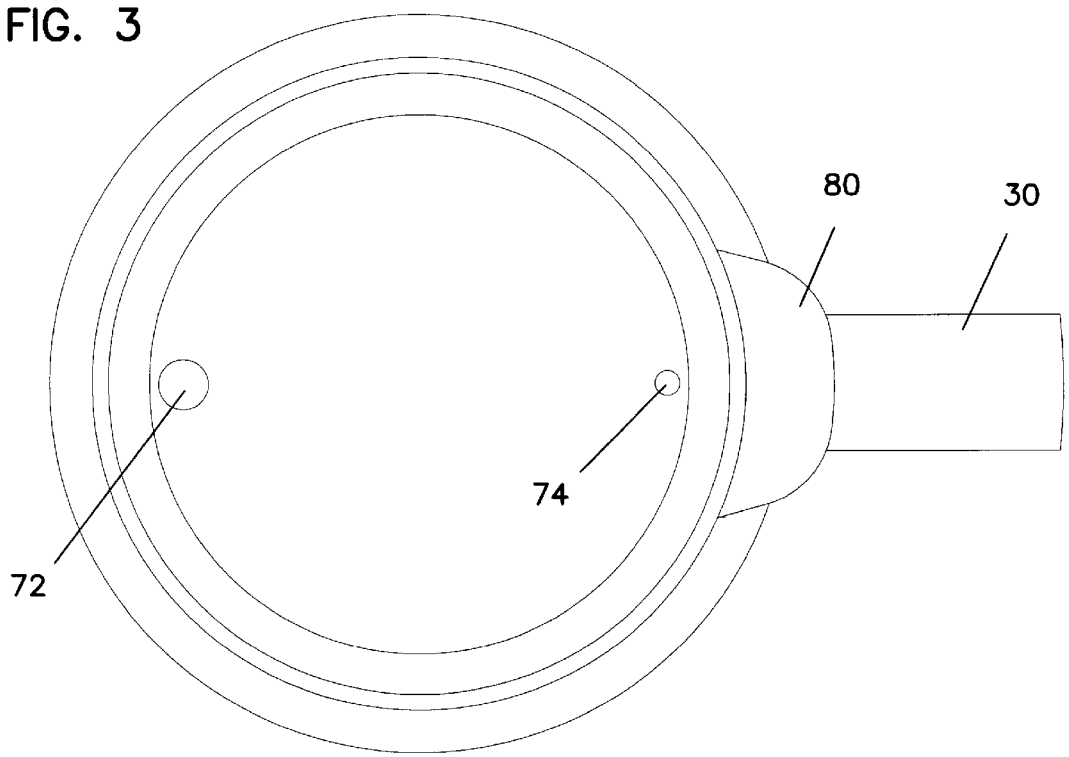
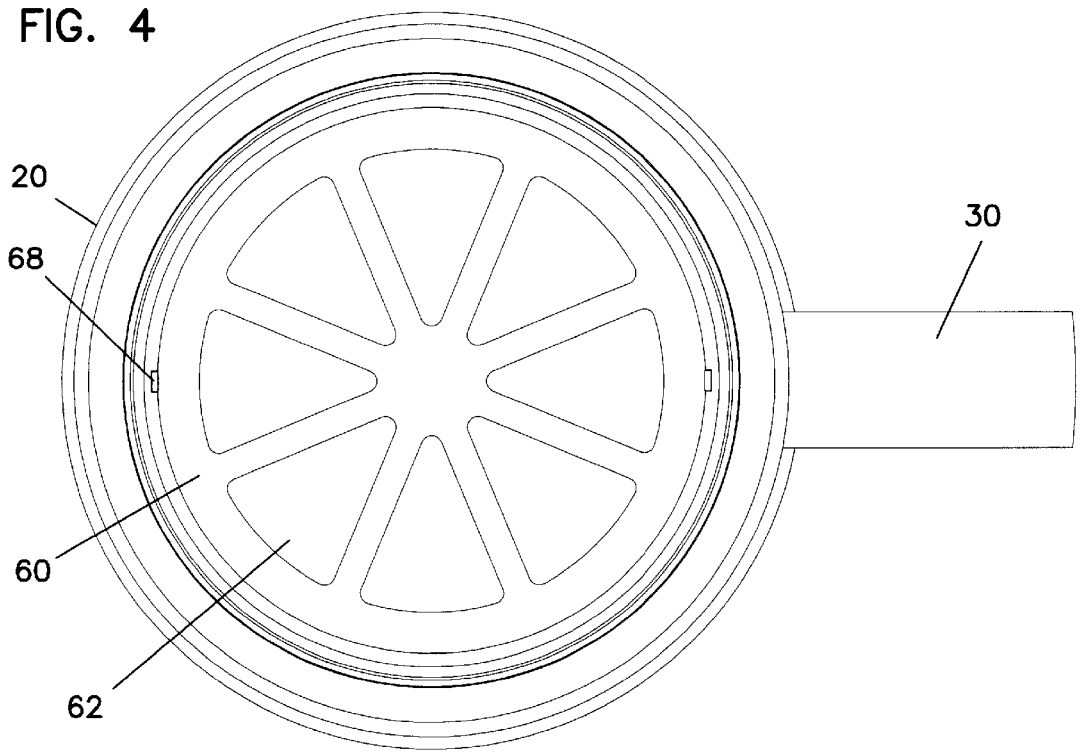

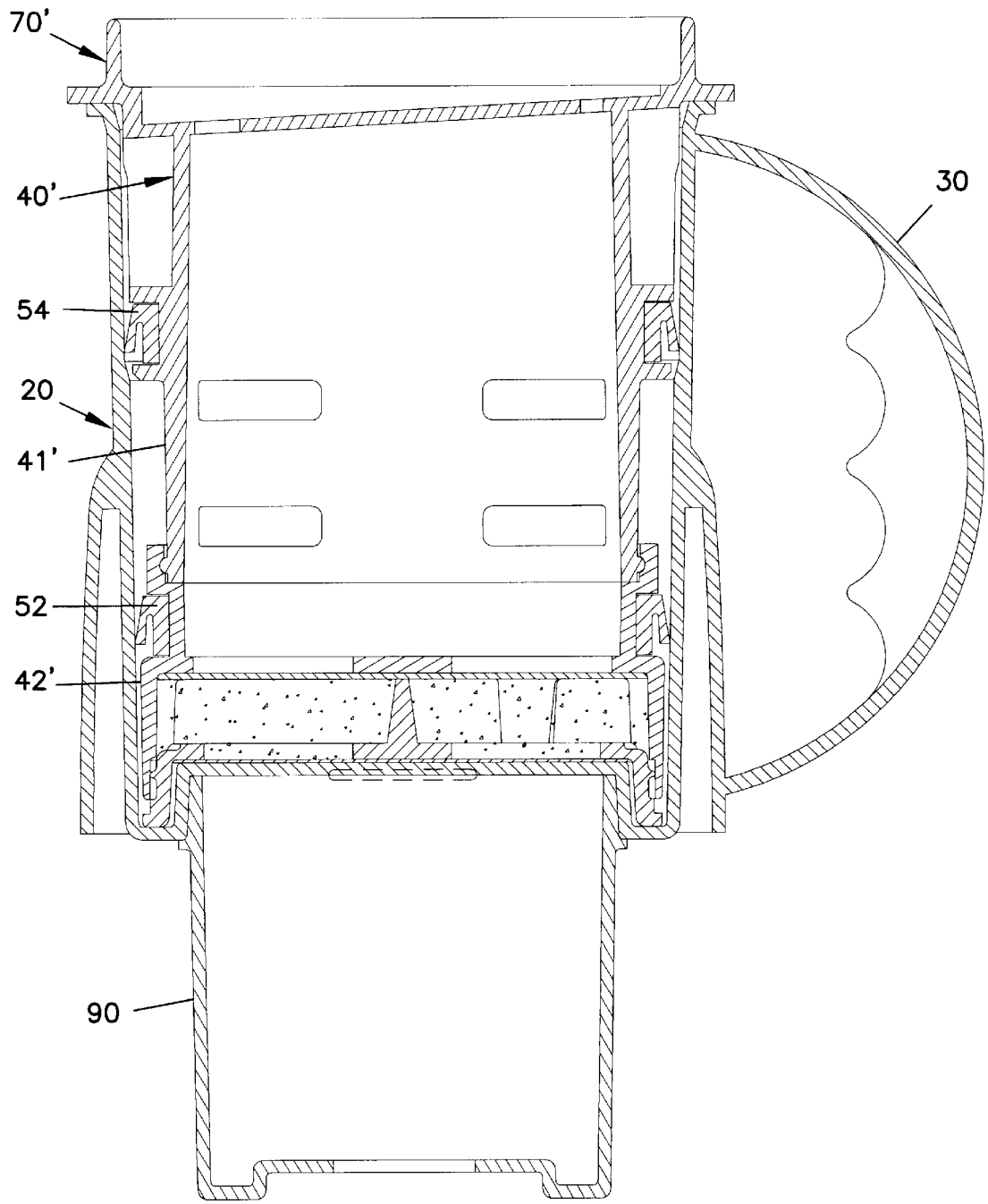

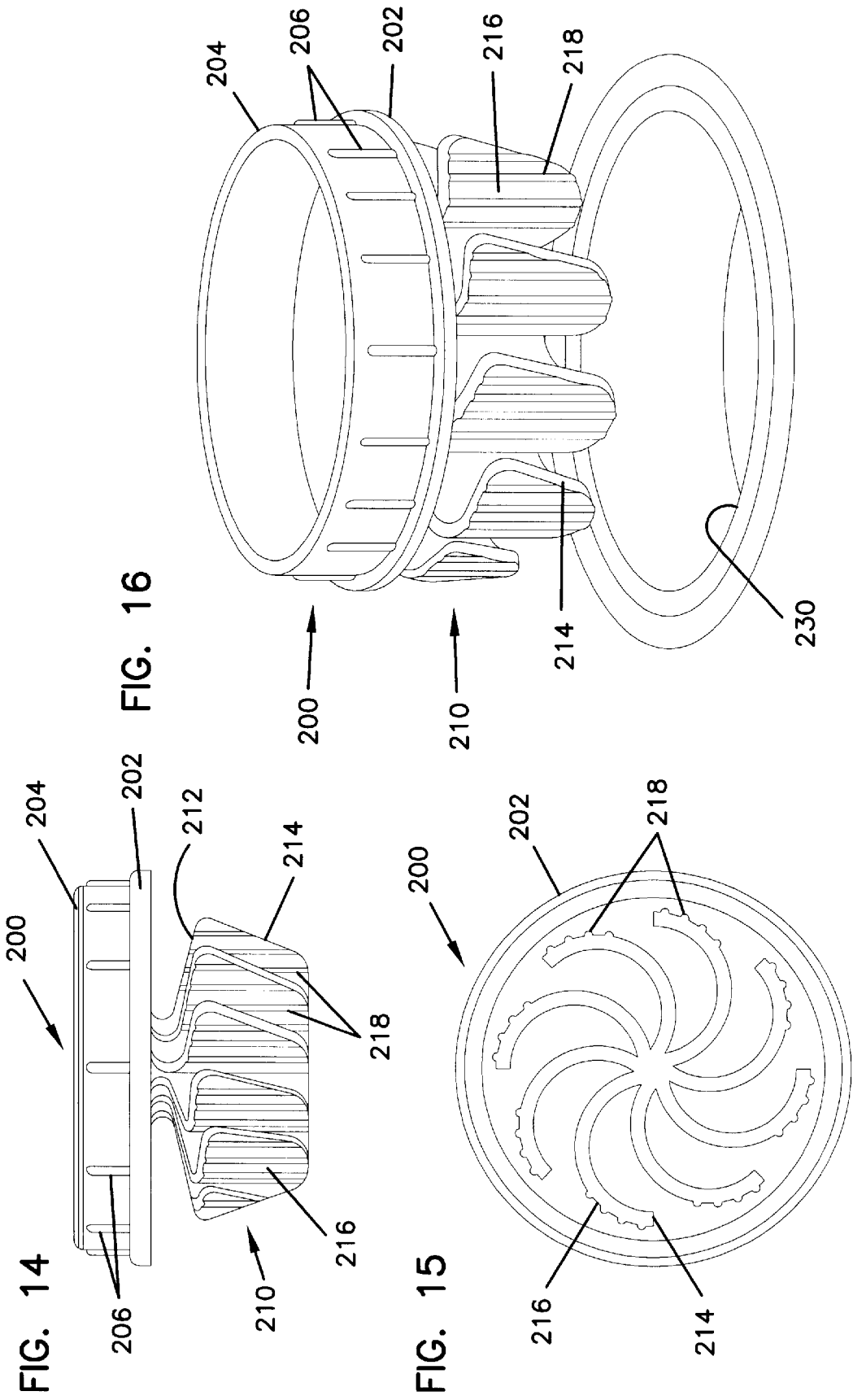

MICROWAVE BEVERAGE MAKER APPARATUS AND METHOD

BACKGROUND OF THE INVENTION

1. Field of the Invention

This invention relates generally to the field of beverage preparation and more particularly to a microwave beverage maker apparatus and method.

2. Description of the Art

In the field of preparation of coffee beverages, it is known to utilize a microwave oven for brewing a cup of coffee. For example, U.S. Pat. No. 5,545,879 discloses a device for brewing coffee in a microwave oven in which the ground coffee floats on the surface of the water in a cup during heating in the microwave. After heating, the container having a mesh bottom is lifted out of the cup to remove the coffee grounds. One problem with such a device is that the user is required to dispose of the coffee grounds prior to consumption of the coffee beverage. Also, the coffee grounds are not circulated throughout the entire cup of coffee during brewing.

Other devices for brewing coffee include coffee presses or plunger-type brewers in which coffee grounds are retained in a mesh container which is disposed in a pitcher of hot water and the container is then reciprocated within the coffee pitcher to brew the coffee (see U.S. Pat. Nos. 3,657,993; 4,365,544). These devices typically include a plunger stem which extends upward through the lid of the pitcher and are not suitable for preparing a single serving of coffee for immediate consumption. These devices also are not designed for use in a microwave oven. Such devices require the transfer of the coffee brewed in the pitcher to a separate cup for drinking, which often results in heat loss.

Another form of a plunger coffee maker involves placing coffee grounds (loose) in hot water and then utilizing a plunger stem and filter to trap the coffee grounds at the bottom of the container after the coffee is brewed (see U.S. Pat. Nos. 5,461,968; 5,618,570). One problem with such a device is that after consumption of the coffee, the coffee grounds must be removed from the bottom of the container, which can be messy and time-consuming for the user.

What is needed is an apparatus and method for making a coffee beverage in the microwave oven which is quick, convenient, and allows the user to immediately consume the coffee within the apparatus. Further, an apparatus is needed which provides for safe, non-spill transport of the coffee beverage after heating, for example, for a person to take in a car on the way to work, and which also allows for easy clean-up of the coffee grounds after use.

SUMMARY OF THE INVENTION

The present invention provides a microwave beverage maker apparatus and method which provides for quick, convenient preparation of a cup of coffee or other brewed beverage for immediate consumption and easy transportation and clean-up of the coffee grounds or other brewing material.

According to one aspect of the present invention, a microwave beverage maker apparatus is provided which includes an outer cup member and an inner cup member. The outer cup member includes an open top, a sidewall and a bottom. The inner cup member includes an open top, a sidewall, a first seal and a basket portion, with the sidewall of the inner cup member dimensioned to fit within the sidewall of the outer cup member. The first seal is disposed along an outer surface of the inner cup member for engaging the inner sidewall of the outer cup member to form a seal while still permitting the inner cup member to move within the outer cup member. The basket portion of the inner cup member is disposed at the bottom of the inner cup member opposite the open top. The basket portion includes a base with at least one aperture and a first filter medium, a downwardly extending sidewall, and a cap member having at least one aperture and a second filter medium. The cap member is releasably connected to the sidewall of the basket portion so that brewing material can be securely retained within the basket portion between the filter medium. The inner cup member is slideable between a first upper position where the basket portion of the inner cup member is disposed above the base of the outer cup member and a second lower position where the basket portion of the inner cup member is disposed against the base of the outer cup member such that liquid is forced through the basket portion when the inner cup member moves between the first and second positions with the first seal engaging the sidewall of the outer cup member. The apparatus preferably includes a lid having an aperture. The lid is secured to the apparatus to close the apparatus.

A second seal, positioned above the first seal, may be further provided to seal against the outer cup member. Each seal preferably includes a downwardly depending flange portion. One or more apertures may be provided in the inner cup member between the seals for fluid flow. A flange at the top of the inner cup member is preferably provided. The lid may be removably attached to the inner cup member, or it may be integrally attached.

In accordance with another aspect of the present invention, there is provided an apparatus for brewing coffee in a microwave having a cup and a basket assembly. The basket assembly includes a basket member having a sidewall, a base having apertures and a filter medium, and a seal. The sidewall of the basket member is dimensioned to fit within the cup and the seal is disposed along the outer sidewall of the basket member for engaging the inner sidewall of the cup to form a seal while still permitting the basket member to move within the cup. The basket assembly further includes a cap member having apertures and a filter medium. The cap member is releasably connected to the basket member such that a brewing material, such as coffee grounds, can be securely retained within the cap member and the basket member between the filter medium. The basket assembly is slidable between a first position at the upper portion of the cup and a second lower position where the basket member and cap member are disposed at the bottom of the cup such that water is forced through the basket member and cap member when the basket assembly moves between the first and second positions with the seal engaged in the sidewall of the cup. A lid having an aperture is removably connected to the top of the apparatus to close the apparatus when the basket assembly is in the second lower position.

According to further aspects of the invention, the basket assembly further includes a flange or second seal extending radially outward from the sidewall of the basket member at a position above the first seal such that the flange or second seal is disposed adjacent the inner sidewall of the cup when the basket assembly is moved from the first to the second position to prevent liquid from escaping upward between the cup and the basket assembly. Preferably, the sidewall of the basket member also includes a plurality of apertures spaced between the flange or second seal and the first seal to permit any escaping liquid to flow into the center of the basket assembly when the basket assembly is moved from the first to the second position.

In accordance with further aspects of the present invention, the basket assembly may include a plurality of axially spaced apertures on the sidewall of the basket member and a plurality of flexible tabs on the cap member such that the tabs are releasably engageable with the apertures to connect the cap member and the basket member. The tabs are preferably flexible to permit the tabs to engage and disengage the apertures to varying axial positions to vary the position of the cap member with respect to the basket member.

According to another aspect of the present invention, the apparatus preferably includes an adapter member designed for engagement with the base of the cup. The adapter member allows the apparatus to be disposed in cup holders of varying sizes such as found in a car.

The above-described features and advantages, along with various other advantages and features of novelty, are pointed out with particularity in the claims of the present application which form a part hereof. However, for a better understanding of the invention, its advantages, and objects obtained by its use, reference should be made to the drawings which form a further part of the present application and to the accompanying descriptive manner in which there is illustrated and described preferred embodiments of the invention.

BRIEF DESCRIPTION OF THE DRAWINGS

FIG. 1 is a front sectional view of a microwave beverage-brewing apparatus according to the principles of the present invention;

FIG. 2 is a front sectional view of a microwave beverage-brewing apparatus according to the principles of the present invention, with the apparatus completely assembled and having a handle;

FIG. 3 is a top plan view of the beverage-brewing apparatus shown in FIG. 1;

FIG. 4 is a partial bottom view of the beverage-brewing apparatus shown in FIG. 1;

FIG. 7 is a side sectional view of a seal of the beverage-brewing apparatus shown in FIG. 1;

FIG. 8 is a side sectional view of an alternative embodiment of a beverage-brewing apparatus according to the principles of the present invention;

FIG. 14 is a side view of an adapter member according to the principles of the present invention;

FIG. 15 is a bottom view of the adapter member shown in FIG. 12;

FIG. 16 is a perspective view of the adapter member shown in FIG. 12 and shown for positioning within a cup holder.

DETAILED DESCRIPTION OF THE INVENTION

Figure 5:
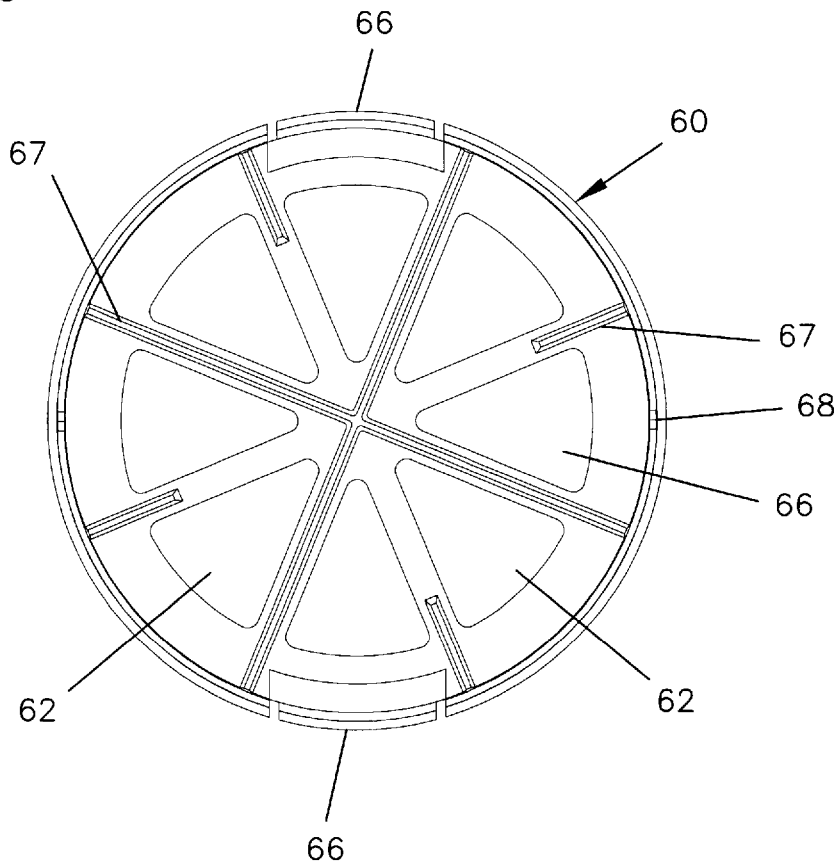
FIG. 5 is a top plan view of the cap member of the beverage-brewing apparatus shown in FIG. 1.

Referring now to the drawings in which similar elements are numbered identically throughout, a description of the preferred embodiments is provided. In FIG. 1, a side view of a microwave beverage-brewing apparatus according to the principles of the present invention is generally illustrated at 10. The beverage-brewing apparatus includes an outer cup member 20 which has a base 24, sidewall 22, an open top 26, and a handle 30. In a preferred embodiment, the outer cup member 20 includes an enlarged diameter portion 23 such that a line 28 is formed on the inner portion of the sidewall 22. This line 28 is preferably used to mark the water level to be used with the beverage-brewing apparatus. It is appreciated that other methods may be used to indicate the water-fill level for the cup. In this preferred embodiment, the cup is sized to hold approximately 12 ounces of water. This allows for the user to make an individual serving of coffee or other brewed beverage. It is understood that the size of the beverage-brewing apparatus 10 may be varied to accommodate varying amounts of beverage to be prepared.

Referring to FIG. 1, the beverage-brewing apparatus 10 includes an inner cup member, or basket assembly, 40 which includes a sidewall 41 and a basket portion 42. The basket portion 42 has a sidewall 43, base portion 44, and a cap member 60. The sidewall 43 of the inner cup member 40 is designed to fit within the sidewall 22 of the outer cup member 20. The base 44 of the basket portion 42 includes a plurality of apertures 46. In a preferred embodiment, the base 44 of the basket portion 42 is arranged with a hub and wheel type design with the apertures 46 disposed between the spokes or ribs of the base 44 (see FIG. 4). It is appreciated that other designs may be utilized in providing at least one aperture in the base 44. The base 44 of the basket portion 42 includes a mesh or filter 48 disposed against the base and covering the apertures 46. In one embodiment, the filter 48 is a plastic mesh which is ultrasonically attached or molded to the base 44. The filter 48 is shown enlarged in the figures. This plastic mesh is preferably a 100 micron mesh. Such a mesh allows for water to pass through the filter 48 while retaining ground coffee. It is appreciated that other size mesh may be utilized as a filter. Additionally, a paper filter may be utilized in conjunction with the filter 48 for added clarity in the brewing process.

The inner cup member 40 includes a first seal 52 which is disposed against an outer portion of the sidewall 41 of the inner cup member 40. In one embodiment, a seal channel 50 is formed in the sidewall 41 of the inner cup member 40 to retain the seal 52. The seal 52 is preferably formed of a flexible, rubber material and includes an outer flange portion 53 which is sized to engage the inner sidewall 22 of the outer cup member 20 when the inner cup member 40 is placed within the outer cup member 20. The flexible nature of the seal 52 permits the inner cup member 40 to move axially within the outer cup member 20 while still maintaining a seal between the inner cup member 40 and the sidewall 22 of the outer cup member 20. In a preferred embodiment, the inner cup member 40 includes a second seal 54 which is disposed at a position above the first seal 52. This second seal 54 is similarly disposed for engagement with the inner sidewall 22 of the outer cup member 20. Additionally, a plurality of apertures 56 may preferably be formed within the sidewall 41 of the inner cup member 40 between the first seal 52 and the second seal 54.

The basket portion 42 of the inner cup member 40 further includes a cap member 60 which is designed for releasable attachment to the sidewall 43 of the basket portion 42. The cap member 60 includes apertures 62 and a filter 64. The apertures 62 of the cap member 60 may be designed similarly to the apertures 46 in the base 44 of the basket portion as shown in FIG. 5. The cap member 60 preferably has a plastic mesh or filter 64 ultrasonically attached or molded to the cap member to cover the apertures 62. The cap member 60 is connected to the sidewall 43 of the basket portion 42 through a plurality of tabs 66 which are designed to engage a corresponding grooves 58 in the sidewall 43 of the basket portion 42. As shown in FIG. 1, the cap member 60 preferably includes opposing flexible tabs 66 which the user may flex inward to remove the cap member 60 from the basket portion 42. Additionally, the cap member 60 may include an alignment tab 68 for engagement with an alignment groove 57 in the sidewall 43 of the basket portion 42. It is appreciated that the cap member 60 may be secured by other types of similar mechanisms which allow the cap member 60 to be releasably connected to the sidewall 43 of the basket portion 42.

The beverage-brewing apparatus 10 further includes a lid 70 designed for attachment to the top of the beverage-brewing apparatus. In one embodiment, the lid 70 is secured to the top of the inner cup member 40 as shown in FIG. 2. Alternatively, the lid could be secured to the rim of the outer cup member 20. The lid preferably includes an annular sidewall 76 and includes an aperture 72 to permit the user to drink from the cup. Additionally, a second aperture 74 is preferably included to facilitate the flow of liquid out of the cup through the drinking aperture 72. The lid 70 preferably includes an annular tab 78 for releasable connection to the inner cup member 40 or outer cup member 20. Referring to FIG. 1, the sidewall 41 of the inner cup member 40 includes an annular groove 59 for receiving the tab 78 of the lid 70. Referring to FIG. 2, an alternative lid connection is illustrated in which the sidewall 41 of the inner cup member 40 includes an extension 81 having a tab 82 for engagement with a groove in the lid 70. Other similar types of connection mechanisms may be utilized to releasably connect the lid. A flange 80 is preferably included to facilitate removing the lid from the inner cup member 40 or outer cup member 20 (see FIG. 3).

To prepare a coffee beverage using this embodiment of the present invention, the user first fills the outer cup member 20 with water. In a preferred embodiment, the outer cup member 20 preferably includes a water line 28 which marks the amount of water required to brew a single serving of coffee. The user then takes the inner cup member 40 and inverts it to place coffee grounds 12 in the basket portion 42 of the inner cup member 40. The user then secures the cap member 60 to the sidewall 43 of the basket portion 42. In this way, the coffee 12 is now secured in the basket portion 42 between the filters 48, 64 of the base 44 and cap member 60, respectively.

The user then places the inner cup member 40, basket portion side down, within the outer cup member 20. The first seal 52 engages the sidewall 22 of the outer cup member 20 and the user pushes the inner cup member 40 down to a first upper position in which the basket portion 42 of the inner cup member 40 is submerged within the water in the outer cup member 20 (FIG. 1). It is appreciated that the seal 52 maintains the inner cup member 40 in this first upper position. With the basket assembly 40 in this first upper position, the user then places the beverage-brewing apparatus 10 in the microwave oven for heating. The user then heats the water in the microwave for several minutes to brew the coffee. It is noted that due to the variability of microwave ovens, the user might need to experiment to determine the proper amount of heating to prepare an appropriately hot cup of coffee. It is appreciated that with the inner cup member 40 in this first upper position which maintains the coffee grounds at an upper surface of the water in the outer cup member 20, a wet extraction process occurs with an enhanced percolation effect to prepare the coffee beverage within the cup. After sufficient heating in the microwave, the user then presses the inner cup member 40 downward from the first upper position to a second lower position where the basket portion 42 of the inner cup member 40 is disposed at the bottom 24 of the outer cup member 20. (See FIG. 2.) As the basket assembly is moved from the first upper position to the second lower position, water is forced through the coffee grounds secured within the basket portion 42 through the apertures 46, 62 in the base 44 and cap member 60 of the basket portion 42. It is appreciated that the first seal 52 engages the sidewall 22 of the outer cup member 20 as the inner cup member 40 is moved from the first upper position to the second lower position so that the water is forced through the apertures 46, 62 in the basket portion 42 of the inner cup member 40. This movement of the basket portion of the inner cup member flushes additional flavor out of the coffee grounds and provides for an even mixture of coffee within the beverage-brewing apparatus.

The user then attaches the lid 70 to the top of the inner cup member 40 and the coffee beverage is ready for consumption. It is appreciated that the lid 70 allows the user to immediately transport the coffee beverage with a reduced risk for spilling. It is appreciated that the inner cup member 40 is securely retained within the outer cup member 20 while the coffee beverage is consumed by the user. Thus, the present invention allows for easy preparation and immediate consumption of the coffee beverage. In addition, the coffee-brewing apparatus 10 allows for easy transportation of the coffee with reduced chance for spilling. For example, the user can make the coffee in the microwave, put the lid on it, and take the coffee cup in the car for drinking on the way to work.

It is noted that enclosing the top of the beverage-brewing apparatus 10 can be accomplished through a variety of methods in addition to the removable lid 70 described above. For example, referring to FIG. 8, an alternative embodiment is disclosed with the lid 70' integral with the top of the inner cup member 40'. In this way, after the user pushes the inner cup member from the upper position to the lower position, the lid 70', integral with the inner cup member 40', rests against the top of the outer cup member 20. This allows for immediate consumption by the user of the coffee beverage. Additionally, FIG. 8 further shows an alternative embodiment in which the basket portion 42' may be separate from the sidewall 41' of the inner cup member 40' rather than integrally formed together as illustrated in FIG. 1.

After the coffee is consumed by the user, the user simply pulls the inner cup member 40' upward to separate the inner cup member 40' from the outer cup member 20. The cap member 60' is then removed from attachment with the basket portion 42' and the coffee grounds may be disposed of. In this way, the coffee grounds are securely retained while the coffee beverage is consumed by the user and then the coffee grounds are easily disposed of without additional mess.

As shown in FIGS. 1 and 2, the beverage-brewing apparatus 10 may include a second seal 54. This seal, along with apertures 56 disposed between the first seal 52 and second seal 54, provide protection against coffee or hot water escaping between the inner cup member 40 and outer cup member 20 during use. In particular, if the inner cup member 40 is moved from the first upper position to the second lower position too quickly, the hot water in the outer cup member 20 may escape past the first seal 52 and then could potentially escape upward between the inner cup member 40 and sidewall 22 of the outer cup member. The second seal 54, along with the apertures 56 in the sidewall 41 of the inner cup member 40, prevent this occurrence by channeling any water that would escape between the first seal 52 and sidewall 22 of the outer cup member 20 back through the apertures 56 in the sidewall 41 of the inner cup member 40 and into the middle of the inner cup member 40. This prevents water from escaping upward out of the outer cup member 20 between the sidewall 22 and the inner cup member 40.

Figure 6:
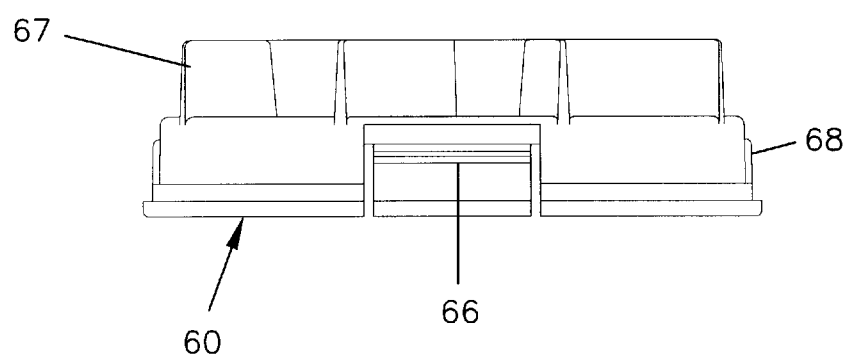
FIG. 6 is a side view of the cap member shown in FIG. 5.

Referring to FIGS. 5 and 6, the cap member 60 of the inner cup member 40 may preferably include a plurality of baffles 67 which extends inward from the base of the cap member 60. Referring to FIG. 5, the baffles 67 separate the cap member into numerous areas. In this way, when the cap member 60 is secured to the sidewall 43 of the basket portion 42, the baffles 67 extend within the basket portion 42 to separate the interior of the basket portion into separate chambers or areas. Accordingly, the baffles 67 of the cap member 60 separate the coffee or other brewing material contained within the basket portion 42 into separate chambers within the basket portion 42. This prevents the coffee or other brewing material contained within the basket portion 42 from grouping or clumping together on one side of the basket portion 42. By separating the brewing material into separate chambers, this ensures contact between the water and the brewing material as the inner cup member 40 is moved from the first upper position to the second lower position. Additionally, if a paper filter is used with the basket portion 42, the baffles 67 serve to hold the paper filter in proper position within the basket portion 42 during use.

Referring to FIG. 7, the first seal 52 is shown having an outer flange 53 which extends at a downward angle with respect to the base portion 55 of the first seal 52. In a preferred embodiment, the outer flange 53 extends at downward angle with respect to the central axis 14 of the apparatus of approximately 15 to 20 degrees, and preferably 18.4 degrees. Referring to FIG. 1, it is appreciated that the use of seal having an outer flange 53 extending at a downward angle facilitates easy removal of the inner cup member 40 from the outer cup member 20 after the beverage has been consumed. Additionally, the downward angle of the first seal 52 still allows for the seal to continuously contact the inner sidewall 22 of the outer cup member 20 to form a continuous seal as the inner cup member 40 is inserted in the outer cup member 20. Preferably, the second seal 54 has a similar construction.

It is appreciated that the various elements of the beverage-brewing apparatus 10 such as the outer cup member 20 and inner cup member 40 are preferably made from a microwave-permeable material. In one embodiment, the coffee-brewing apparatus is made from polypropylene, ethylene, polymethylpentene or other microwave-transparent material. It is further understood that this embodiment is disclosed to brew a coffee beverage. Other types of beverages, such as tea, may also be prepared in accordance with the principles of the present invention.

Figure 9:
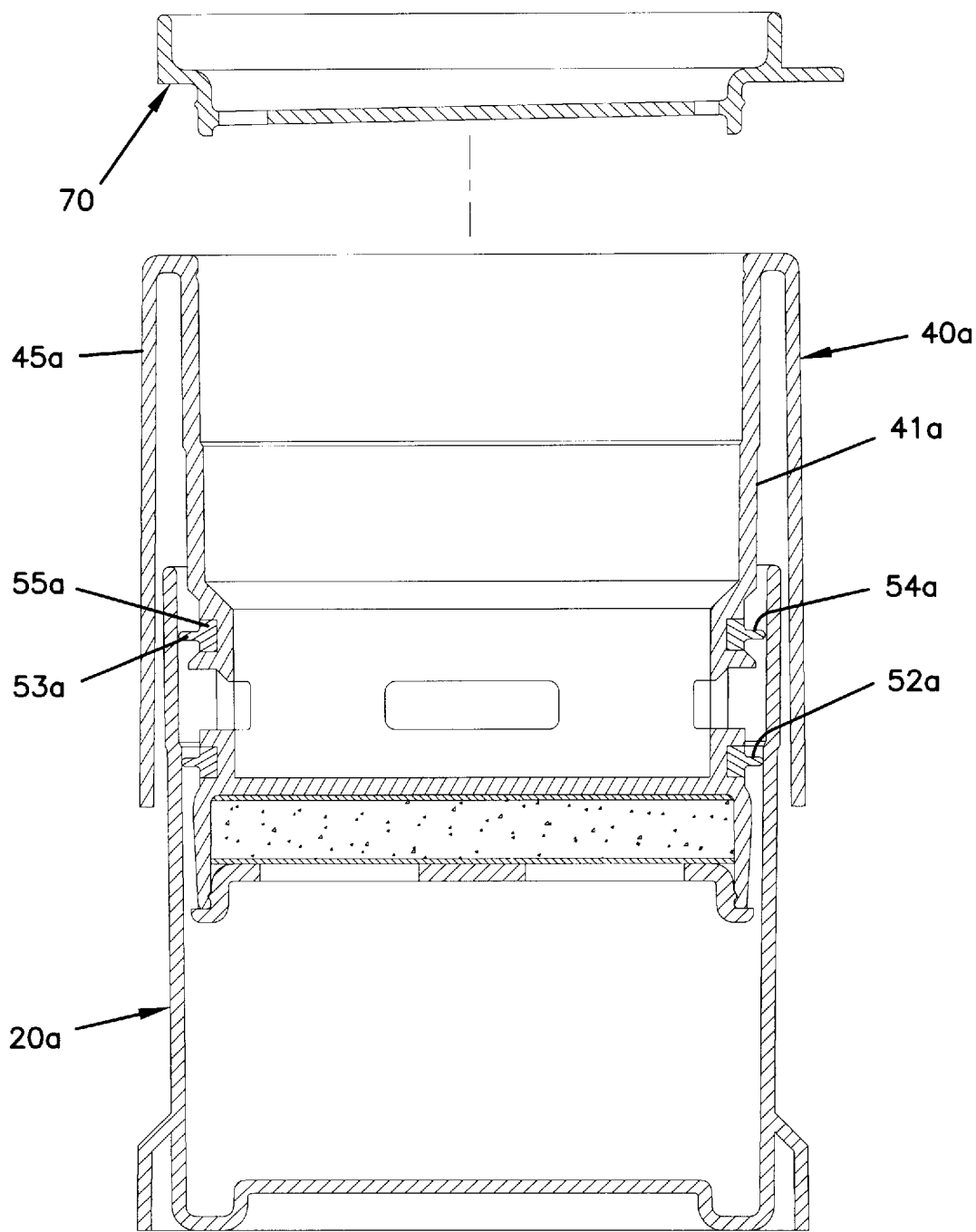
FIG. 9 is a front sectional view of a second alternative embodiment of a beverage-brewing apparatus according to the principles of the present invention.

Referring to FIG. 9, an alternative embodiment for the beverage-brewing apparatus is shown. In this embodiment, the inner cup member 40a includes an outer sleeve 45a which is integrally formed with the sidewall 41a of the inner cup member 40a. As the inner cup member 40a is inserted into the outer cup member 20a, the outer sleeve member 45a is disposed outside the sidewall 22a of the outer cup member 20a. Additionally, the seals, 52a and 54a, are illustrated as having the outer flange 53a extending substantially perpendicular to the base 55a of the seal.

Figure 10:
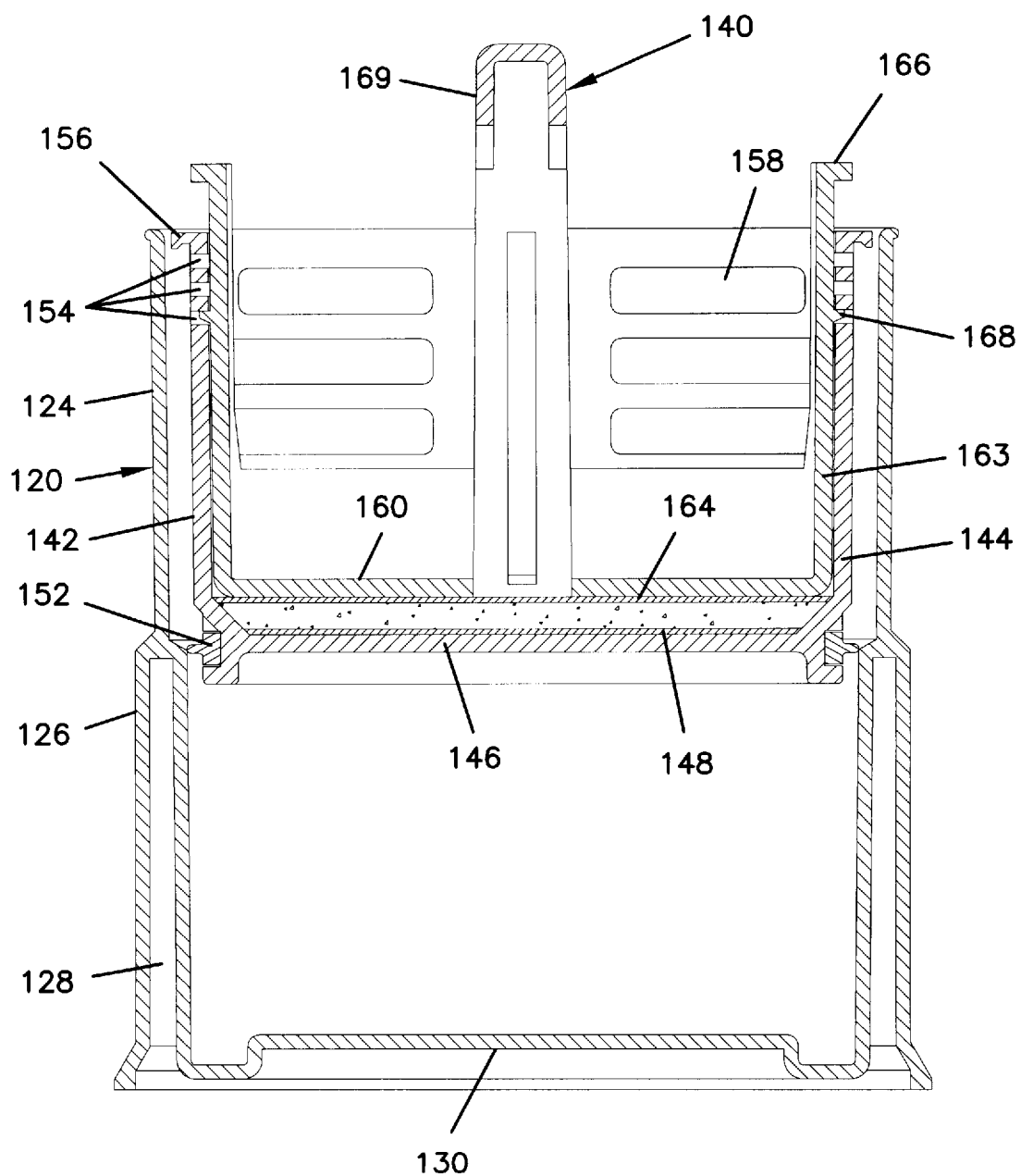
FIG. 10 is a front sectional view of a third alternative embodiment of a beverage-brewing apparatus according to the principles of the present invention.
Figure 11:
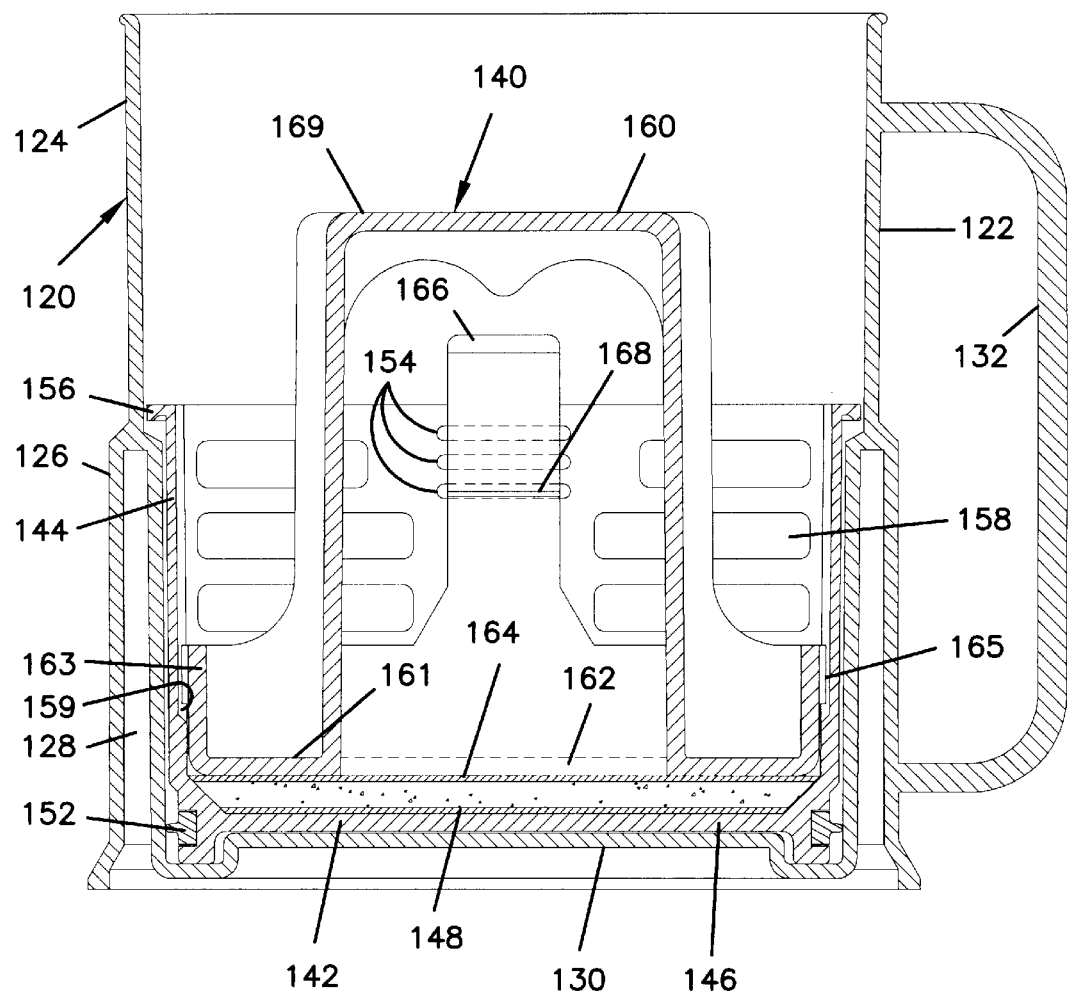
FIG. 11 is a side sectional view of the alternative beverage-brewing apparatus shown in FIG. 10 with the basket assembly shown in the lower position.

Referring to FIGS. 10 and 11, another embodiment for the beverage-brewing apparatus is shown. In this embodiment, the cup 120 includes a sidewall 122 having a single upper sidewall 124 and a double-walled lower sidewall 126. This double-wall portion 126 correspondingly forms a channel 128 which acts as an insulating barrier to better maintain the temperature of the coffee beverage contained in the cup. The cup 120 preferably includes a handle 132.

In this embodiment, the beverage-brewing apparatus includes a basket assembly 140 (or inner cup member) having a basket member 142 and a cap member 160 which is releasably connected to the basket member. The base 146 of the basket member includes apertures and has a plastic filter 148 or mesh screen attached thereto. The basket member includes a seal 152 which is disposed in the sidewall 144 of the basket member 142. The upper sidewall of the basket member 142 preferably includes an annular flange 156. Preferably, the sidewall 144 of the basket member 142 includes apertures 158 positioned between the flange 156 and seal 152. The flange 156 is sized to closely fit within the upper sidewall 124 of the cup 120. In this way, the flange acts to prevent liquid from escaping from between the sidewall 144 of the basket member 142 and the sidewall 122 of the cup 120 when the basket assembly is moved from the first upper position to the second lower position. The flange 156 deflects any water seeking to escape and directs it through the apertures 158 disposed in the sidewall 144 of the basket member 142.

The cap member 160 is designed to fit within the sidewall 144 of the basket member for releasable connection thereto. The base 161 of the cap member includes apertures 162 to permit liquid to flow therethrough and includes a filter 164 or mesh attached to the base 161. In this embodiment, the cap member 160 is secured within the basket member 142 preferably at varying locations to permit varying amounts of coffee to be retained within the basket assembly 140. Referring to FIGS. 10–11, the cap member includes flexible tabs 166 which extend upward from the base 161 of the cap member. These flexible tabs include a raised portion 168 which is designed to engage corresponding slots 154 disposed on the sidewall 144 of the basket member 142. To connect the cap member 160 to the basket member 142, the user simply pulls the flexible tabs 166 inward and positions the cap member 160 within the sidewall 144 of the basket member 142 so that the raised portions 168 of the flexible tabs 166 are disposed adjacent the slots 154 in the sidewall 144 of the basket member 142. The user then releases the tabs 166 so that the raised portion 168 of the tabs 166 is securely retained within the slots 154 in the basket member 142. In one embodiment, the basket member 142 includes several pairs of slots 154 disposed at varying axial positions along the sidewall of the basket member 142. In this way, the cap member 160 can be positioned at varying positions with respect to the basket member 142. This allows for the user to place varying amounts of coffee grounds in the basket member and then secure the cap member 162 securely retain the coffee within the basket assembly 140. It is appreciated that other similar type mechanisms may be used to secure the cap member to the basket member.

The basket assembly 140 preferably includes means to align the basket member 142 and cap member 160 so that the flexible tabs 166 engage the corresponding slots 154 in the basket member. Referring to FIG. 11, the cap member 160 preferably includes alignment tabs 165 which extend radially outward from the sidewall 163 of the cap member 160. The inner sidewall 144 of the basket member 142 correspondingly includes alignment slots 159 which are designed to engage the alignment tabs 165 in the cap member 160. In this way, in order to connect the cap member 160 and the basket member 142, the user simply rotates the cap member 160 within the inner sidewall 144 of the basket member 142 until the alignment tabs 165 engage the alignment slots 159 so that the flexible tabs 166 are aligned with the corresponding slots 154 to connect the cap member 160 and basket member 142.

In operation, the person takes the basket member 142 and fills the base with an appropriate amount of coffee or other brewed beverage. The cap member 160 is then aligned through the alignment tabs and slots 165, 159, respectfully, so that the flexible tabs 166 are then pulled inward and allowed to engage the appropriate slots 154 in the basket member 142. The user then takes the basket assembly 140 and places it within the cup 120 which contains an appropriate amount of water for the serving required. Referring to FIG. 10, the seal 152 of the basket member engages the inner sidewall of the cup 120 adjacent the upper portion of the lower double-sidewall 126. At this location, the water level sufficiently covers the coffee grounds retained within the basket assembly 140. The apparatus is then placed in the microwave and heated an appropriate amount. After heating, the user grabs the handle 169 of the basket assembly and pushes the basket assembly 140 from the first upper position shown in FIG. 10 to the lower position against the base 130 of the cup 120 as shown in FIG. 11. As the cup moves from the first to the second position, water flows through the apertures in the basket assembly including the coffee grounds to further enhance the flavor of the coffee beverage. A lid is then placed on top of the cup 120.

Figure 12:
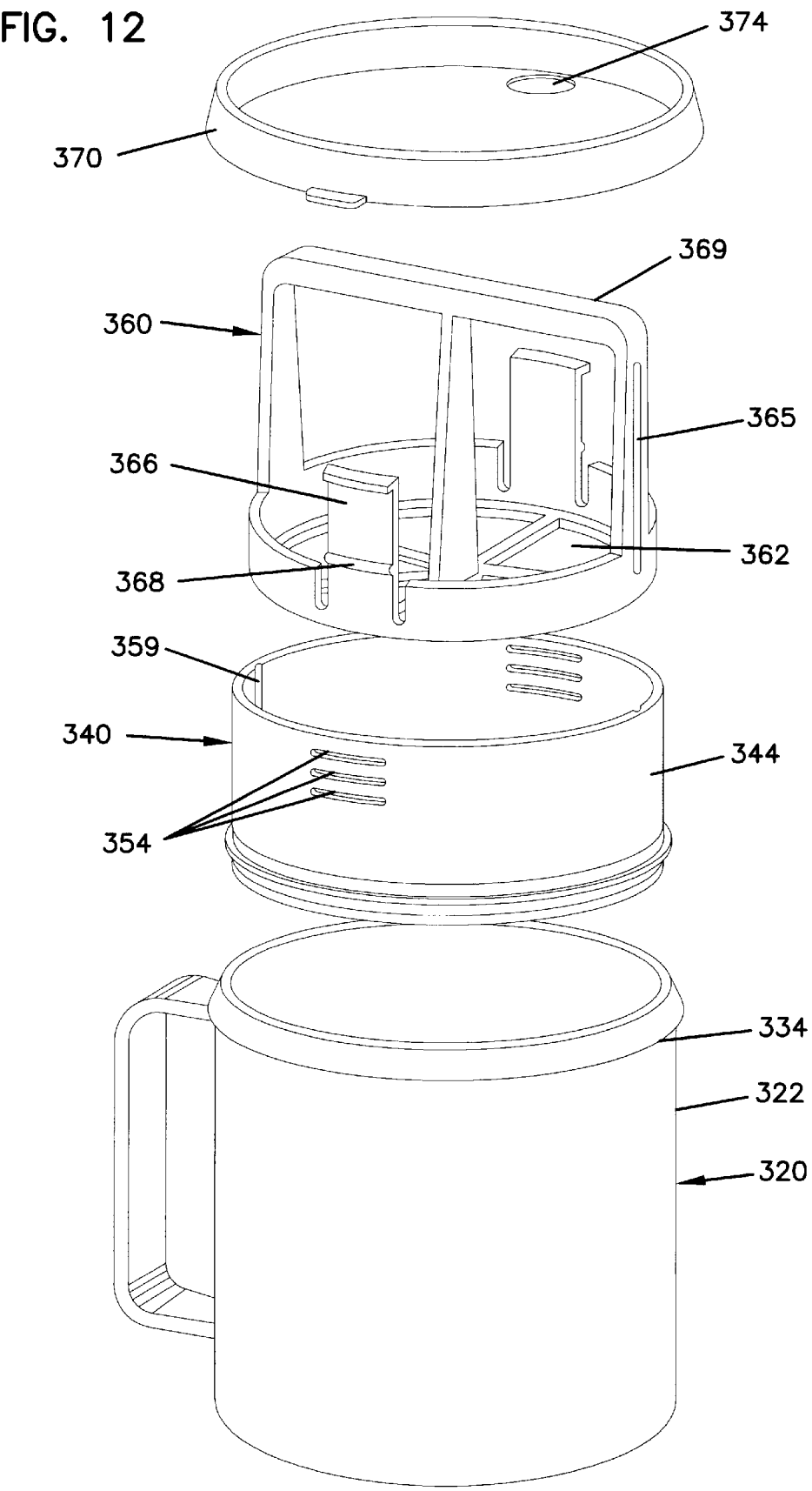
FIG. 12 is an exploded perspective view of a fourth alternative beverage-brewing apparatus according to the principles of the present invention.
Figure 13:
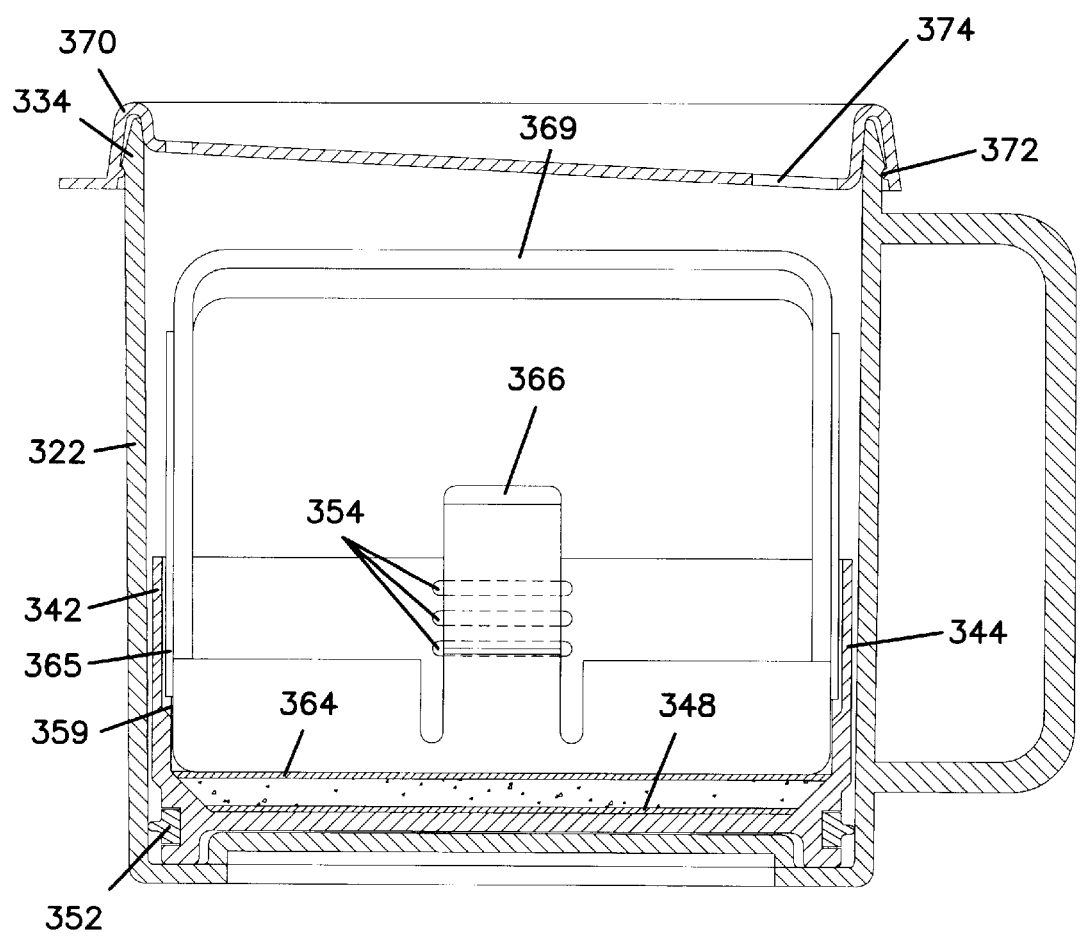
FIG. 13 is a front sectional view of the beverage-brewing apparatus shown in FIG. 12.

Referring to FIGS. 12 and 13, an additional embodiment according to the principles of the present invention is shown. In this simplified embodiment, the basket assembly 340 includes a single seal 352 which engages the sidewall 322 of the cup 320 with coffee or other brewed material contained within the basket assembly between filter medium 348, 364. This embodiment similarly includes the flexible tabs 366 having a raised portion 368 for engagement in the corresponding slots 354 in the sidewall 344 of the basket member 342 as well as the alignment tabs 365 for engagement in the alignment slots 359 for connecting the cap member 360 to the basket member 342 (see FIG. 12).

In this embodiment, the top of the cup 320 has a lip 334 which engages a corresponding tab 372 on the lid 370 to secure the lid to the cup. As shown in FIG. 13, the lid may be angled downward toward the aperture 374 for drinking the coffee beverage. After placing the lid on the cup, the user may then easily transport the beverage and it is ready for immediate consumption. After the beverage has been consumed, the user removes the lid 370 and pulls upward on the handle 369 to remove the basket assembly 340 from within the cup 320. The user then depresses the flexible tabs 366 inward to remove the cap member 360 from the basket member 342. The coffee grounds contained at the base of the basket member can then be removed for easy clean-up.

According to another aspect of the present invention, the beverage-brewing apparatus preferably includes an adapter member so that the coffee-brewing apparatus 10 can be retained within cupholders of varying diameters. Such an adapter member is useful so that the coffee-brewing apparatus 10 can be easily transported in a vehicle such as a car. Referring to FIG. 2, an adapter member 90 is preferably provided which is connected to the bottom 24 of the outer cup member 20. The adapter 90 has a smaller diameter than the outer cup member 20 which allows the beverage-brewing apparatus 10 to be secured within an appropriate cup adapter having a diameter slightly larger than the diameter of the adapter 90.

Referring to FIGS. 14–17, an alternative adapter member 200 includes a base 202 which includes a connector member 204 designed for connection to the base 24 of the cup 20. As shown in FIG. 2, the base 24 of the outer cup member 20 preferably includes an annular channel 32 which is designed to receive the connector member 204 which is cylindrical in shape and includes ribs 206 to releasably connect of the adapter member 200 to the base of the cup 20. (See FIG. 17.)

The adapter member 200 includes an attachment member 210 designed for engagement with the cup holder. The attachment member 210 extends downward from the base 202 of the adapter member and includes a plurality of flexible, curved gripping members 212, each having an outer edge 14 which tapers inward from the top of the gripping member to the bottom as shown in FIG. 14. The curved surface 216 of the gripping members 212 includes several ribs 218 which extend radially outward.

Figure 17:
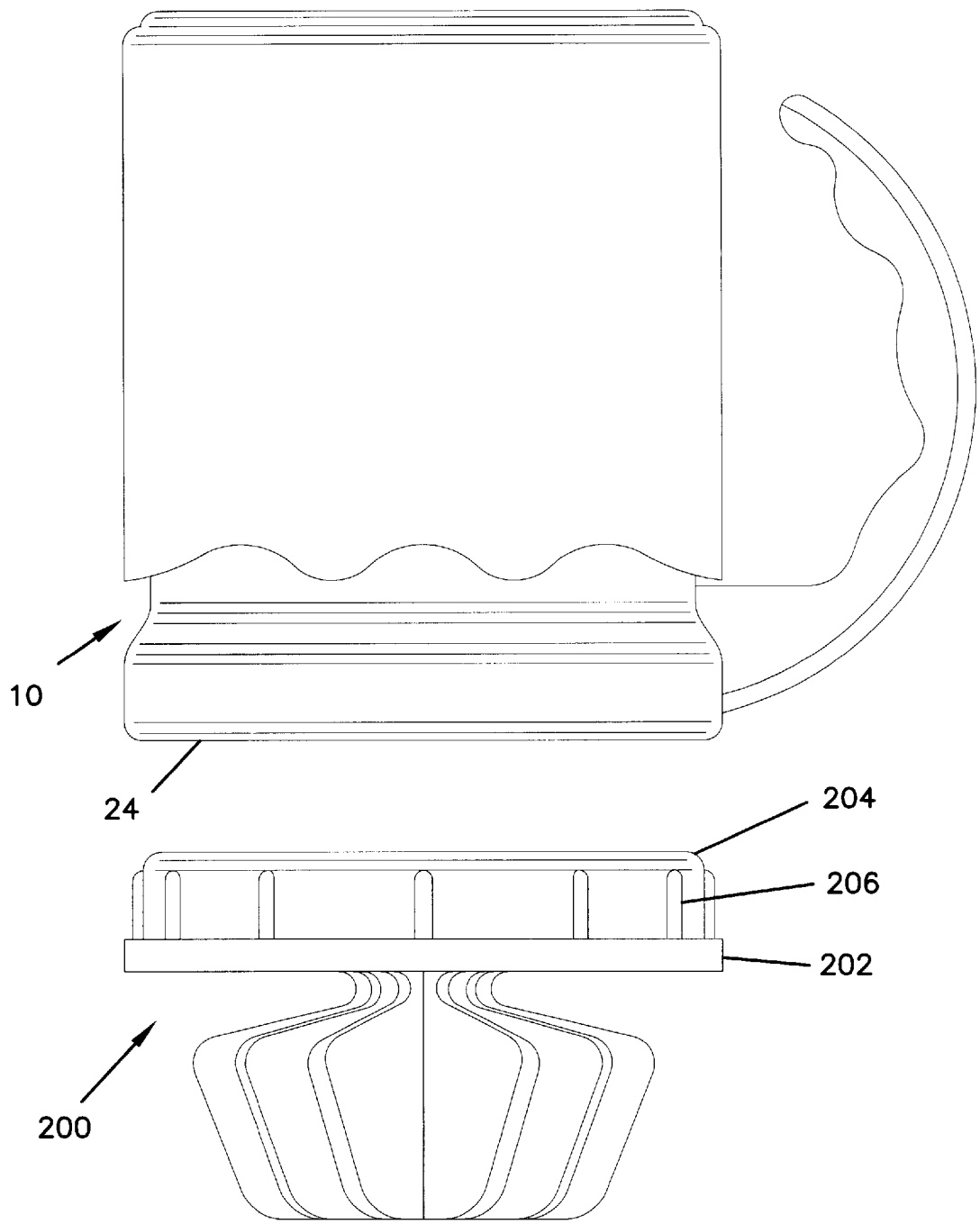
FIG. 17 is a front view of a beverage-brewing apparatus according to the principles of the present invention with an adapter member positioned below the cup.

In use, the adapter member 200 is secured to the base 24 of the cup 20 by inserting the connector member 204 into the channel 32 formed in the base 24 of the cup 20 (see FIG. 17). The cup 20 with the adapter member 200 is then ready to be inserted in a cup holder, such as one found in the car. The user then lowers the cup 20 having the adapter member 200 into the cup holder which has an annular inner sidewall 230 (see FIG. 16) so that the outer edge 214 of the gripping members 212 engage the inner sidewall 230 of the cup holder. The cup and adapter member are then rotated so that the outer curved surface 216 of the gripping members 212 engages the inner sidewall of the cup holder 230. In this way, the ribs 218 on the outer curved surface 216 of the gripping members 212 contact the inner wall of the cup holder to more securely retain the adapter member within the cup holder. To remove the cup and adapter member from the cup holder, the user simply rotates the cup and adapter member in the opposite direction so that the curved outer surface 216 of the flexible gripping members disengages from the inner sidewall 230 of the cup holder so that the cup and adapter member may then be removed from the cup holder for drinking.

It is to be understood that even though numerous characteristics and advantages of various embodiments of the present invention have been set forth in the foregoing description, together with the details of the structure and function of various embodiments of the invention, this disclosure is illustrative only and changes may be made in the details, especially in matters of shape, size, and arrangement in part within the principles of the present invention, to the full extent indicated by the broad general meaning of the terms in which the appended claims are expressed.

Other modifications of the invention will be apparent to those skilled in the art in view of the foregoing descriptions.

These descriptions are intended to provide specific examples of embodiments which clearly disclose the present invention. Accordingly, the invention is not limited to the described embodiments or to use of specific elements, dimensions, materials, or configurations contained therein. All alternative modifications and variations of the present invention which fall within the spirit and broad scope of the appended claims are covered.

What is claimed is:

1. A microwave beverage maker apparatus for brewing coffee, tea or other brewed beverage in a microwave oven comprising:

a outer cup member having an open top, a sidewall and a base opposite the open top;

an inner cup member having an open top, a sidewall, a first seal and a basket portion, the sidewall of the inner cup member dimensioned to fit within the sidewall of the outer cup member, the first seal disposed along an outer surface of the inner cup member for engaging an inner sidewall of the outer cup member to form a seal while still permitting the inner cup member to move within the outer cup member;

wherein the basket portion of the inner cup member is positioned at a bottom of the inner cup member opposite the open top and includes a base having at least one aperture and a first filter medium disposed adjacent the aperture of the base of the basket portion, and a downwardly extending sidewall, the sidewall of the basket portion dimensioned to fit within the sidewall of the outer cup member; the basket portion further including a cap member having at least one aperture and a second filter medium disposed adjacent the aperture of the cap member, the cap member releasably connected to the sidewall of the basket portion at a bottom of the inner cup member such that a brewing material can be securably retained within the basket portion of the inner cup member between the filter medium;

wherein the inner cup member is slideable between a first upper position where the basket portion of the inner cup member is disposed above the base of the outer cup member and a second lower position where the basket portion of the inner cup member is disposed against the base of the outer cup member such that liquid within the outer cup member is forced through the basket portion when the inner cup member moves between the first and second positions with the first seal engaging the sidewall of the outer cup member;

a lid having an aperture, the lid being removably secured to the top of one of the inner cup member or the outer cup member to close the apparatus.

2. The apparatus of claim 1 wherein the inner cup member further includes a second seal extending radially outward from the sidewall of the inner cup member at a position above the first seal such that the second seal engages the inner sidewall of the outer cup member when the inner cup member is moved from the first to the second position to form a second seal.

3. The apparatus of claim 2 wherein the sidewall of the inner cup member includes a plurality of apertures spaced between the first and second seals to permit liquid to flow into the center of the inner cup member when the inner cup member is moved from the first to the second position.

4. The apparatus of claim 1 wherein the inner cup member includes a flange disposed at the top of the inner cup member such that when the inner cup member is in the second lower position, the flange of the inner cup member is disposed against the top of the outer cup member.

5. The apparatus of claim 1 wherein the lid is removably secured to the top of the inner cup member to close the apparatus.

6. The apparatus of claim 1 wherein the first seal includes a base portion disposed against the inner cup member and a flange portion which extends outwardly from the base portion to engage the inner sidewall of the outer cup member, the flange portion of the first seal disposed at a downward angle.

7. The apparatus of claim 6 wherein the flange portion of the first seal extends outward and downward with respect to a central vertical axis of the apparatus at angle of approximately 15 to 20 degrees.

* * * * *